(12) United States Patent
Berns et al.

(10) Patent No.: US 6,910,342 B2
(45) Date of Patent: Jun. 28, 2005

(54) HIGH TEMPERATURE LIMIT THERMOSTAT WITH MANUAL LOCKOUT SAFETY

(75) Inventors: Mark I. Berns, Northbrook, IL (US); Tom Buckshaw, Indiana, PA (US)

(73) Assignee: Robertshaw Controls Company, Richmond, VA (US)

( * ) Notice: Subject to any disclaimer, the term of this patent is extended or adjusted under 35 U.S.C. 154(b) by 42 days.

(21) Appl. No.: 10/684,947

(22) Filed: Oct. 14, 2003

(65) Prior Publication Data

US 2005/0077366 A1    Apr. 14, 2005

(51) Int. Cl.[7] .................. F25D 29/00; H01H 37/46; H01H 37/70
(52) U.S. Cl. ................ 62/164; 337/384; 337/348; 337/367
(58) Field of Search .................. 62/164; 236/94, 236/DIG. 2; 337/384, 348, 367, 343, 362, 337/354

(56) References Cited

U.S. PATENT DOCUMENTS 4,039,991 A * 8/1977 Bucheister ............. 337/348
5,854,585 A * 12/1998 Kingma ................. 337/367

OTHER PUBLICATIONS

Robertshaw Controls Company, Model RX Millivolt Direct Current Electric Thermostat brochure, 2 pages, Robertshaw Controls Company, New Stanton, PA, Apr. 1993.

* cited by examiner

Primary Examiner—Chen Wen Jiang
(74) Attorney, Agent, or Firm—Leydig, Voit & Mayer, Ltd.

(57) ABSTRACT

A manual reset high temperature limit thermostat is provided. The manual reset lockout feature is provided by a lock rod that is outwardly transitioned upon actuation of the thermostat when the sensed temperature reaches its high level limit. A manual reset reset slide then engages the lock rod to prevent automatic resetting of the thermostat once the sensed temperature decreases below the thermostat set point. Resetting of the thermostat once the temperature has decreased may be accomplished by sliding the switch to disengage the reset slide from the locking rod. The thermostat internal snap action mechanism then retracts the lock rod and resets the thermostat's electrical contacts.

20 Claims, 12 Drawing Sheets

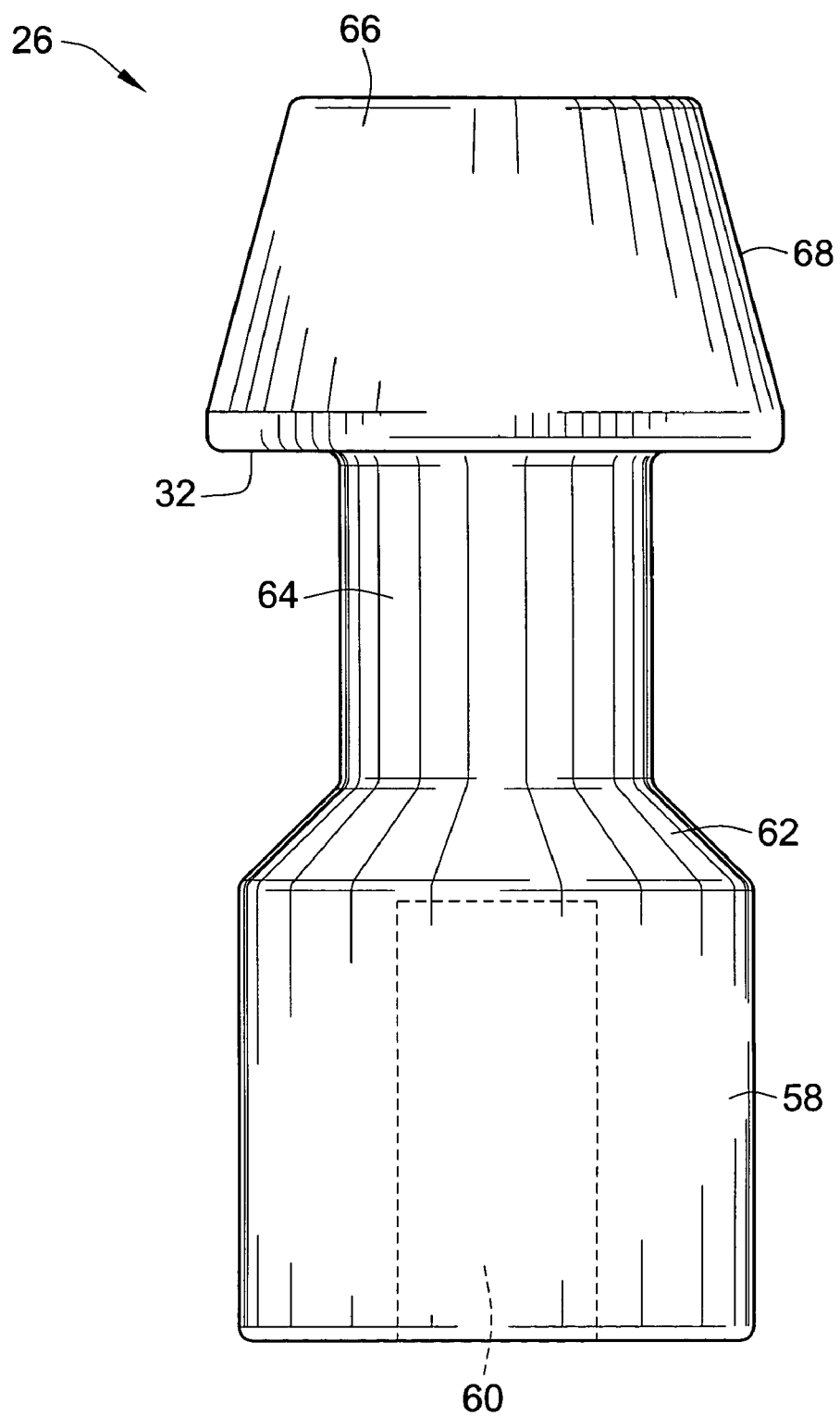

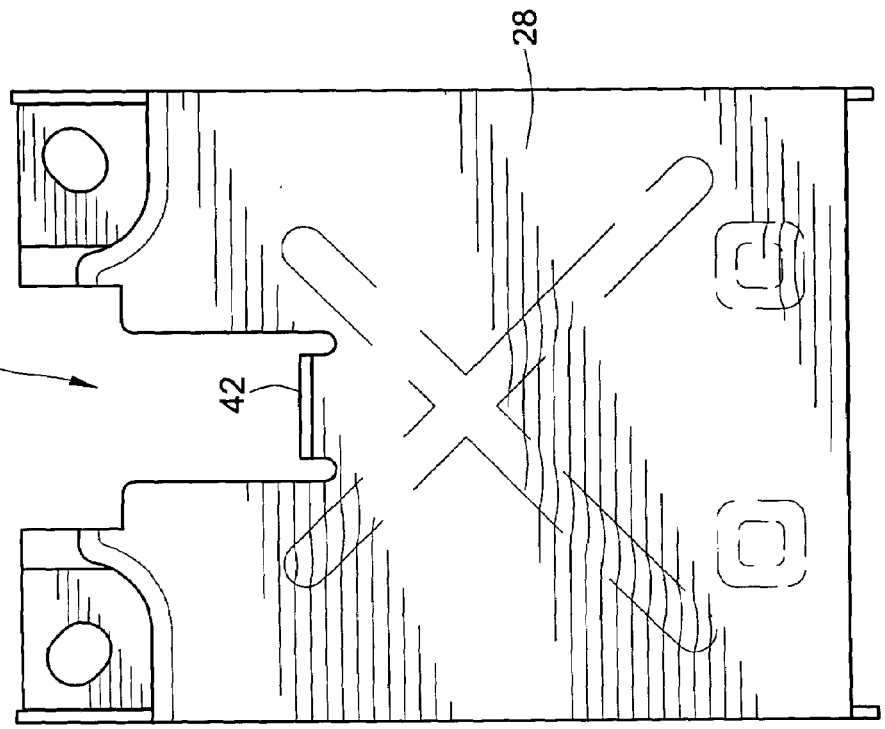
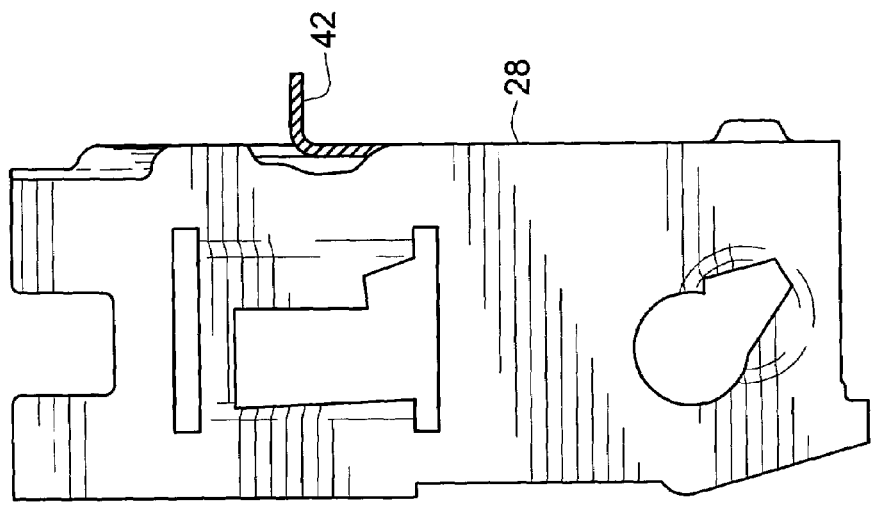

HIGH TEMPERATURE LIMIT THERMOSTAT WITH MANUAL LOCKOUT SAFETY

FIELD OF THE INVENTION

The present invention relates generally to electric thermostats, and more particularly to high temperature limit electric thermostats.

BACKGROUND OF THE INVENTION

Systems whose proper operation requires temperature regulation typically employ some form of electric thermostat to control a heating or cooling source to maintain the temperature at a desired set point or within a desired range. Such systems are widely varied, and include deep fryers, griddles, ovens, boilers, etc. These high temperature applications typically use an electric thermostat that utilizes a bulb and capillary tube to actuate a control mechanism at a user selected, or preset temperature.

In one exemplary system, to wit a deep fryer in a commercial restaurant application, a gas burner is utilized to provide the thermal energy to the oil bath used for deep frying. The gas flowing to the burner is controlled by a gas flow control valve. The positioning of the valve, for example open or closed, is regulated by an electric thermostat whose temperature sensing bulb is positioned within the oil bath used for deep frying. To eliminate the need for an external power source, the gas flow control valve may utilize a thermopile wire as is well known in the art. The electric thermostat typically includes a knob or other user interface to allow the user to set the desired temperature for the oil bath.

During operation, the thermostat monitors the temperature of the oil bath via the immersed bulb. If the monitored temperature of the oil bath is below the set point temperature of the thermostat, the gas flow control valve is opened to allow the flow of gas to the burner. The burner ignition system then ignites the gas at the burner to raise the temperature of the oil bath. Once the temperature reaches the set point of the thermostat, the thermostat mechanism switches off the gas flow control valve to stop the flow of gas to the burner. As the temperature of the oil bath begins to drop, the automatic reset function of the electric thermostat switches to again command the gas flow control valve to open to once again allow the flow of gas to the burner. In this way, the oil in the oil bath is maintained at the desired set point temperature, within a range, to ensure proper cooking of the deep fried foods.

An electric thermostat particularly well suited to high temperature applications such as that described above is the model RX Millivolt Direct Current Electric Thermostat sold by Robertshaw Controls Company. This single pole thermostat is designed especially for demanding millivolt/milliamp direct current applications, such as those that utilize a thermopile to eliminate the need for an external power source. This Model RX electric thermostat includes a hermetically sealed reed switch to provide durability and accuracy in the harshest environments with ambient temperatures reaching 230° F. This thermostat includes a rugged steel case design with screw type terminals to ensure electrical integrity in such harsh environments, and provides a precise and proven snap action mechanism to control, for example, a gas flow control valve.

Operation of this proven model RX electric thermostat may be better understood with reference to the cross-sectional illustration of this thermostat of FIG. 14. This cross-sectional illustration of the model RX electric thermostat 21 illustrates the positioning of the snap-action mechanism 23 such that the contacts of the reed switch 25 are open circuit. The reed switch 25 is carried in a terminal block 27 that serves as the carrier for the electrical terminal connections 29. Within the terminal block 27, the actuating mechanism 31 of the snap action mechanism 23 is allowed to transition between a first position illustrated in this FIG. 14 and a second illustrated in FIG. 15. The transitioning of the actuating mechanism 31 between these two positions causes the contacts of the reed switch 25 to transition between open and closed positions under the influence of magnet 33 carried by the actuating mechanism 31. That is, as the magnet 33 is moved away from the reed switch 25 (see FIG. 14), the contacts of the reed switch 25 open. However, when the magnet 33 is brought into close proximity to the reed switch 25 (FIG. 15), the contacts of the reed switch 25 close.

The transitioning between the two positions of the actuating mechanism 31 is accomplished when the fluid in the temperature sensing bulb expands and contracts with the temperature variation in the media sensed by the bulb. As the fluid expands, it causes a deformation in the diastat 35 which causes the actuator post 37 to push down on an actuating dimple 39 of the snap action mechanism 23. Once a sufficient deformation of the diastat 35 has caused a sufficient lateral translation of the actuating post 37, the snap action mechanism operates to cause a rapid position change of the actuating mechanism 31. Similarly, as the temperature in the sensed media drops, the fluid in the temperature sensing bulb contracts. As the fluid is evacuated down the capillary tube, the diastat 35 is allowed to return to its undeformed position, thereby effectuating a lateral translation of the actuating post 37 away from the dimple 39. Once a sufficient translation has occurred, the snap action mechanism 23 again functions to provide a rapid transition of the actuating mechanism 31 to its alternate position. To aid in this precise movement between the two positions of the actuating mechanism 31, and to minimize the amount of bounce that may occur in the actuating mechanism during this transition, a pair of positioning springs 41, 43 are carried in the actuating mechanism 31 within the terminal block 27. As discussed above, a user actuated knob may be provided on the adjusting screw 45 to allow the user to vary the operating point of the snap action mechanism 23.

In many of the applications discussed above, a failure of the thermostat to turn off the gas flow control valve may result in overheating of the oil bath, oven cavity, griddle surface, etc., as the burner continues to supply thermal energy. While most systems provide a manual shutoff of the burner, such requires that a person sense the overheating condition and turn off the burner. If this condition is not noticed, however, the thermal overheating may result in food being overcooked or the existence of a hazardous condition.

There exists a need in the art, therefore, for a high temperature limit backup thermostat that will shut off the burner upon failure of the primary control thermostat prior to reaching a hazardous temperature.

BRIEF SUMMARY OF THE INVENTION

In view of the above, the present invention provides a new and improved high limit thermostat. More particularly, the present invention provides a new and improved low voltage high temperature thermostat having a manual reset. Further, the present invention provides a new and improved thermostat with manual reset that provides either a predetermined or a manually settable high limit temperature at which the thermostat will actuate. As such, the high limit thermostat with manual reset of the present invention is ideally suited for backup thermostat and safety functionality in systems in which thermal runaway may occur upon loss of primary thermostat control.

In a preferred embodiment of the present invention, a high limit electric thermostat includes a temperature sensing bulb coupled via a capillary tube to a diastat within the thermostat housing. The diastat deflects in response to expansion and contraction of fluid within the temperature sensing bulb. This deflection of the diastat acting through a member activates a snap-action mechanism at a particular temperature to transition an actuating mechanism from a first position to a second position to actuate a switch in the thermostat. This embodiment includes a terminal block and a lock rod that is affixed to the actuating mechanism and that extending through a channel in the terminal block. A back cover also includes a channel, which terminates in a spring tab. A reset slide is slidably accommodated in the cover channel, and has a locking sled that extending from the main body of the switch. A bias spring is positioned between the spring tab and the reset slide to bias the reset slide toward the lock rod.

In one embodiment, the lock rod includes a reduced diameter portion that terminates in a locking head. Between these two portions is defined a locking shoulder. Preferably, the locking head is extended through the terminal block channel upon transition of the actuating mechanism from the first position to the second position. Further, the locking sled of the reset slide is biased toward the reduced diameter portion in proximity to the locking shoulder. Transition from the second position to the first position of the actuating mechanism is prohibited by the locking sled of the reset slide in contact with the locking shoulder of the lock rod. However, transition from the second position to the first position of the actuating mechanism is allowed upon manual action to slide the reset slide away from the lock rod against the bias of the bias spring. In one embodiment, an outer surface of the locking head provides an angled profile that forms a cam surface in relation to the locking sled of the reset slide.

Preferably, the locking sled of the reset slide is accommodated in the terminal block channel. Also in a preferred embodiment, the reset slide includes a cavity to accommodate the bias spring. It further includes a cowl extending reward of the cavity to accommodate the spring tab of the back cover during movement of the reset slide. Additionally, the reset slide includes a pair of cover receiving slots on either side to slidably position the reset slide within the back cover channel.

In an alternate embodiment of the present invention, a high limit electric thermostat comprises a thermostat housing, a diastat positioned within the thermostat housing, a temperature sensing bulb coupled via a capillary tube to the diastat, a switch mechanism coupled to the diastat, a lock rod affixed to the switch mechanism and extending through the thermostat housing, and a reset slide. The reset slide engages the lock rod to allow transition of the switching mechanism from a first state to a second state and to prevent transition of the switching mechanism from the second state to the first state. In one embodiment, the switch mechanism comprises a snap action mechanism operably coupled to the diastat and an actuating mechanism coupled to the snap action mechanism. In this embodiment, the lock rod is affixed to the actuating mechanism.

In a preferred embodiment, the reset slide is slidably accommodated in a channel in the thermostat housing, which terminates in a spring tab. The thermostat further comprises a bias spring positioned between the spring tab and the reset slide to bias the reset slide toward the lock rod. Preferably, the thermostat housing includes a terminal block in which the channel is defined. Further, the thermostat housing also preferably defines a second channel through which the lock rod extends. In this embodiment, the reset slide includes a locking sled which is slidably accommodated in this second channel. Preferably, the thermostat housing includes a back cover in which the second channel is defined.

Preferably, the diastat deflects in response to expansion and contraction of fluid within the temperature sensing bulb. This deflection of the diastat, acting through a member, activates a snap-action mechanism at a particular temperature to transition the actuating mechanism from the first position to the second position. This actuating mechanism preferably includes a magnet. The switch mechanism further comprises a reed switch positioned in proximity to the actuating mechanism such that transition of the actuating mechanism between the first and the second positions transitions contacts of the reed switch. In one embodiment, the reset slide is manually operable to allow transition of the switching mechanism from a second state to a first state. Preferably, the thermostat further comprises an adjusting screw to allow a user to vary an operating point of the switch mechanism.

In an alternate embodiment of the present invention, a temperature regulation system comprises a primary temperature control thermostat having a temperature sensing element positioned within an environment to be regulated, and a high temperature limit thermostat having a second temperature sensing element positioned within an environment to be regulated. The system also includes a heating control mechanism that is electrically coupled to the primary temperature control thermostat and to the high temperature limit thermostat such that the heating control mechanism shuts off when either of the primary temperature control thermostat and the high temperature limit thermostat commands the heating control mechanism to shut off. Preferably, the high temperature limit thermostat includes a manual reset mechanism that comprises a lock rod affixed to a switch mechanism of the high temperature limit thermostat and extending through the housing. A reset slide operably engages the lock rod to allow transition of the switching mechanism from a first state to a second state and to prevent transition of the switching mechanism from the second state to the first state.

Preferably, manual resetting via the reset slide is required once the high temperature limit thermostat commands the heating control mechanism to shut off before the high temperature limit thermostat can transition from the second state to the first state. In one embodiment, the temperature at which the high temperature limit thermostat commands the heating control element to shut off is preset.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 8 is a front view illustration of a lock rod used in the embodiment of FIG. 2;

FIG. 12 is a top view illustration of a back cover of the embodiment of FIG. 2;

FIG. 13 is a side view illustration shown in partial cutaway of the back cover of FIG. 12;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
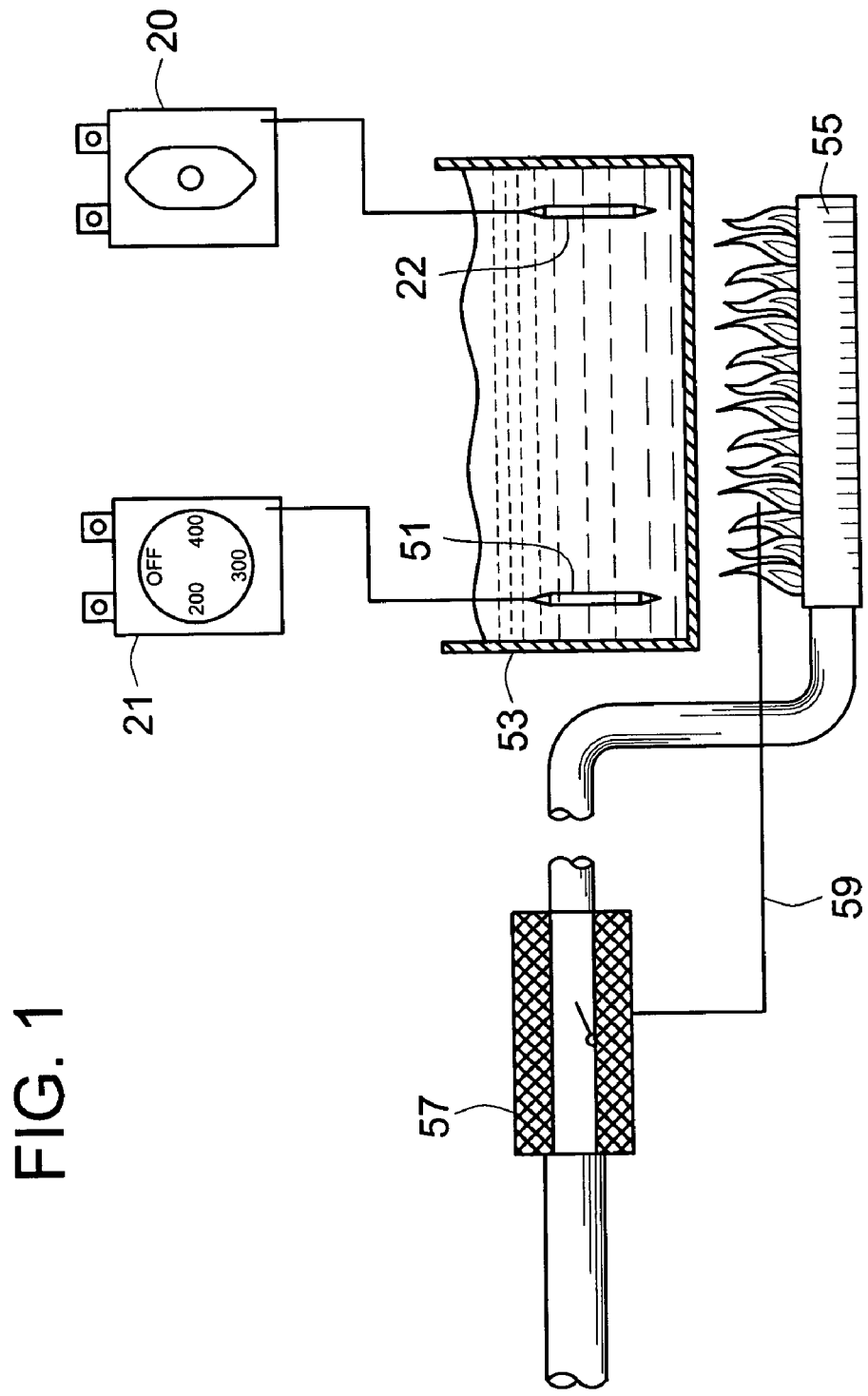
FIG. 1 is a simplified system-level diagram of an exemplary environment for which the thermostat of the present invention is particularly well-suited.

FIG. 1 illustrates an exemplary environment in which the thermostat 20 of the present invention is particularly well-suited. As discussed above in the background section, a typical deep fryer system utilizes a control thermostat, such as the model RX Millivolt Direct Current Electric Thermostat 21 to sense the temperature via bulb 51 of the oil bath 53. When the temperature of the oil bath 53 is below the set point of thermostat 21, the gas flow control valve 57 is allowed to open to provide fuel to burner 55 to heat the oil bath 53. Also as discussed above, many such systems utilize a thermopile 59 to eliminate the need for an external power source. As the temperature of the oil bath 53 increases, the fluid in bulb 51 expands at a known rate. Once the temperature of the oil bath 53 has reached the set point of the thermostat 21, the thermostat 21 commands the gas flow control valve 57 to close to turn off burner 55. As the temperature of the oil bath 53 falls, the fluid in bulb 51 contracts. Once the temperature of oil bath 53 has fallen an amount equal to or greater than the hysteresis of thermostat 21, the thermostat 21 again actuates to command the gas flow control valve 57 to open to again allow burner 55 to heat the oil bath 53.

In many such environments as the deep fryer of FIG. 1, an overheating condition resulting from a failure of the thermostat 21 to close the gas flow control valve 51 may result in an undesirable condition. Indeed, if the gas flow control valve 57 is allowed to stay open indefinitely, the temperature of the oil bath 53 may increase to a high level. To prevent the undesirable condition from occurring, the thermostat 20 of the present invention is utilized as a high-temperature limit, redundant control mechanism for the gas flow control valve 57. Because of the highly reliable and durable construction of the model RX electric thermostat, this mechanism is desired. However, the automatic resetting control function of the model RX electric thermostat does not provide the safety feature required for such situations. Specifically, if a failure of the main control thermostat 21 occurs, the temperature of the oil bath 53 will increase until the high temperature limit of thermostat 20 sensed by bulb 22 is reached. At this point, the high temperature limit thermostat 20 will actuate to close gas flow control valve 57 and shut off burner 55. However, once the temperature of the oil bath 53 drops below the hysteresis set point of the switching mechanism of the model RX thermostat, the thermostat would again automatically actuate to open the gas flow control valve 57. In effect, if the model RX thermostat were used as the high temperature limit thermostat, the oil bath would then be regulated to and maintained at this high temperature limit value. As such, a worker may not be alerted to the fact that the primary thermostat 21 has failed.

Figure 2:
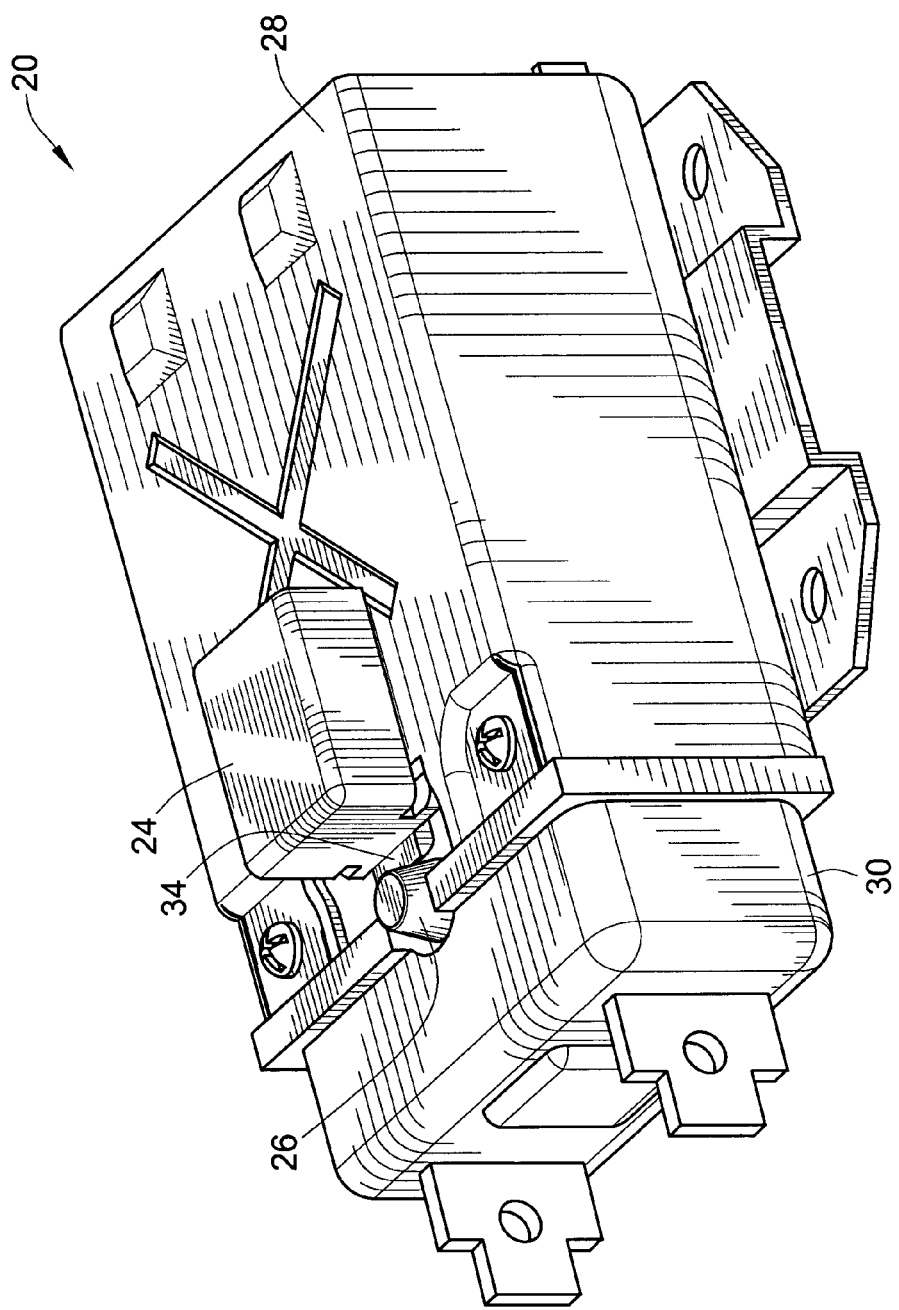
FIG. 2 is perspective view of an embodiment of a manual reset temperature limit thermostat constructed in accordance with the teachings of the present invention shown in its un-actuated state.

To prevent the oil bath 53 from merely being regulated at the high temperature limit set point upon failure of the primary control thermostat 21, the thermostat 20 of the present invention eliminates the automatic resetting feature of the Model RX and provides a manual reset requirement. In one embodiment of the present invention, as illustrated in FIG. 2, the manual reset feature is embodied in a reset slide 24 that must be actuated by maintenance personnel once the thermostat 20 has actuated to turn off the gas flow valve. The embodiment illustrated in FIG. 2 of the high temperature limit thermostat 20 of the present invention illustrates the normal or unactuated position of the manual reset mechanism. This mechanism includes the reset slide 24, and a lock rod 26. In this embodiment of the present invention, the reset slide 24 is preferably carried on the back cover 28 of the thermostat 20. The terminal block 30 of this embodiment of the present invention accommodates translation of the lock rod 26 therethrough.

Figure 3:
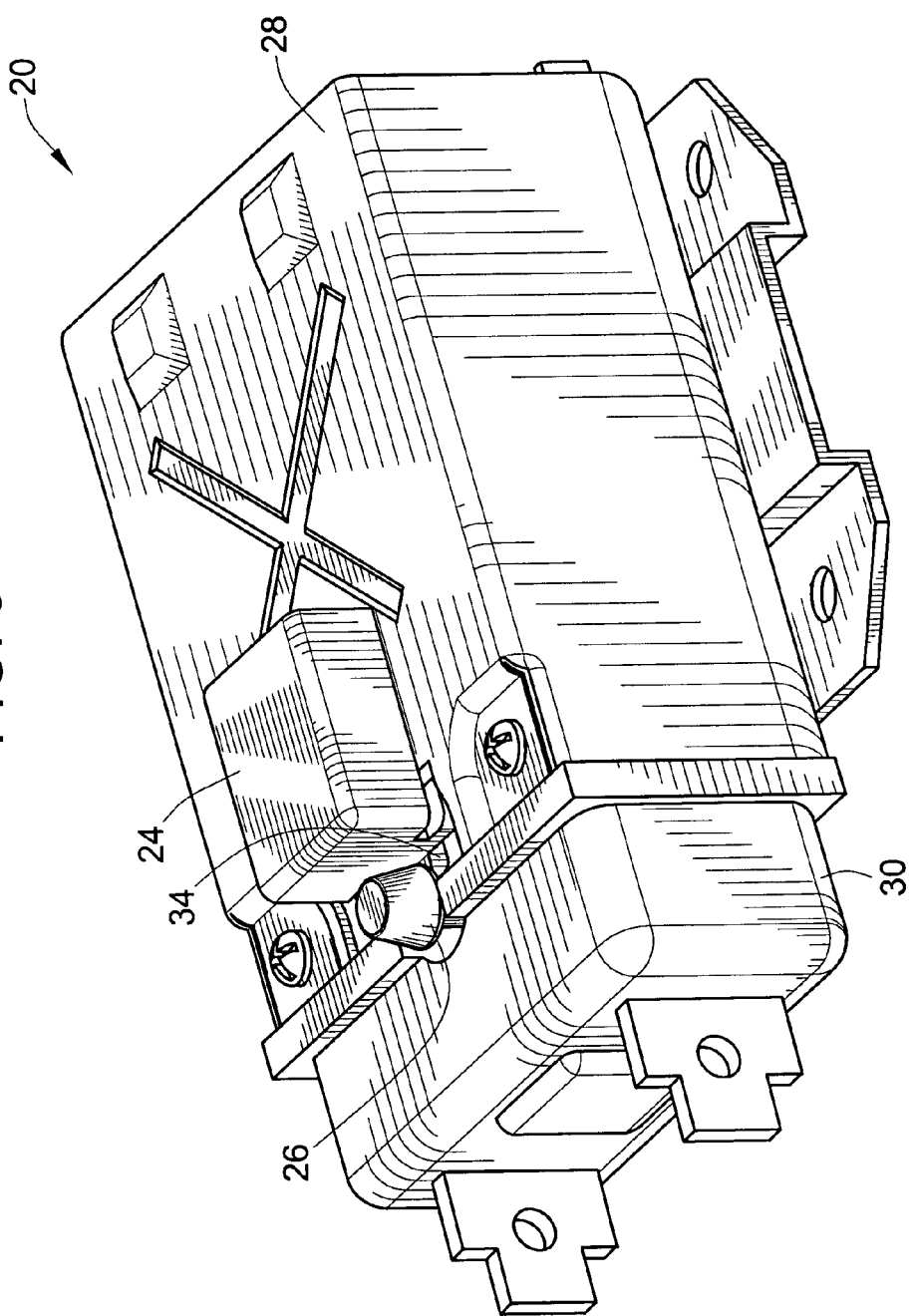
FIG. 3 is a perspective view illustration of the embodiment of FIG. 2 shown in its actuated state.

As illustrated in FIG. 3, once the temperature sensed by bulb 22 increases to the temperature limit set point of thermostat 20, the end of lock rod 26 is translated out of terminal block 30. Once in this position, the spring loaded reset slide 24 is able to slide under the locking shoulder 32 of the lock rod 26. As such, the lock rod 20 is captured in this position. That is, despite a reduction in the temperature sensed by bulb 22, the thermostat 20 of the present invention cannot automatically reset and allow the gas flow control valve 57 to again open to ignite burner 55.

A maintenance person will then need to be called to replace the failed thermostat 21, and to manually reset the high temperature limit thermostat 20. This manual resetting may be performed by sliding the spring loaded reset slide 24 away from the lock rod 26. Once the locking sled 34 has been withdrawn from under shoulder 32 of the lock rod 26, the internal mechanism of thermostat 20 is allowed to reset.

Figure 4:
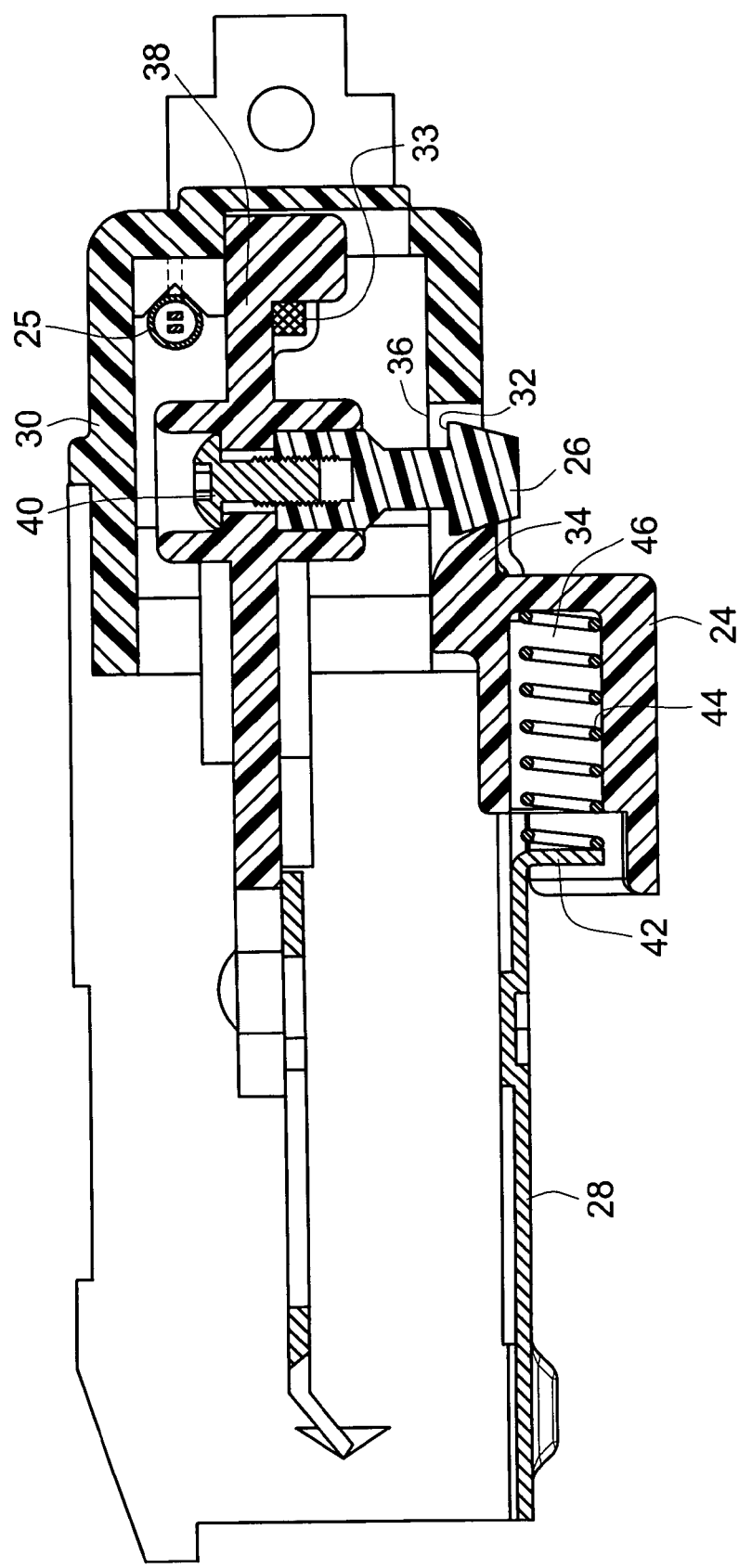
FIG. 4 is a simplified cross-sectional illustration of the embodiment illustrated in FIG. 2.
Figure 5:
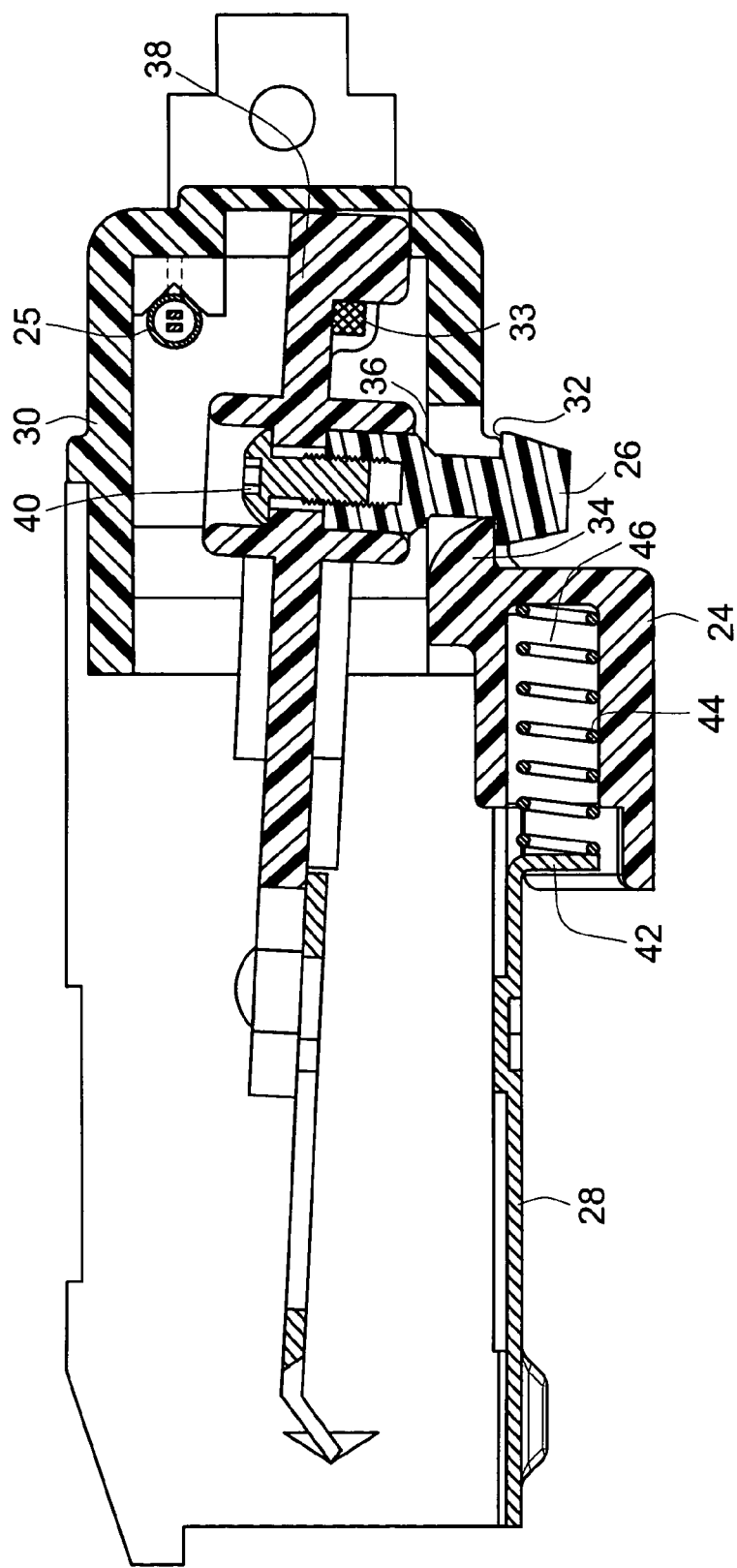
FIG. 5 is a simplified cross-sectional illustration of the embodiment illustrated in FIG. 3.

This operation may be better understood from the following discussion with reference to FIGS. 4 and 5. Specifically, FIG. 4 illustrates a simplified cross-sectional view of an embodiment of a thermostat 20 constructed in accordance with the teachings of the present invention. In these simplified cross-sectional views, the snap action spring mechanism actuated by the diastat as the fluid and bulb 22 expands and contracts is not shown. However, as will be recognized by one skilled in the art, this mechanism from the model RX electric thermostat may be used without modification to perform the reliable and rapid actuation once the temperature limit set point has been reached.

Turning specifically to FIG. 4, this exemplary embodiment of thermostat 20 is illustrated in the unactuated position. In a typical configuration, this position would equate to having closed contacts on the reed switch 25. In this position, the normal control of thermostat 21 is not affected by this high limit thermostat 20. Both the locking sled 34 portion of the reset slide 24 and the lock rod 26 are accommodated in a channel 36 in terminal block 30. The lock rod 26 may be retained within actuating mechanism 38 by a screw 40 or other fastener. One skilled in the art will recognize that other fasteners may be used to retain lock rod 26, such as glue or other adhesives, press fit, spin welds, threading, etc. Additionally, the lock rod 26 may also be formed as part of the actuating mechanism 38.

The manual resettable reset slide 24 is carried by the back cover 28 as will be described more fully below. Preferably, the back cover 28 includes a spring tab 42 that serves as a contact point for spring 44. This spring 44 provides the sliding force to bias the locking sled 34 against the lock rod 26. This spring 44 is carried within a cavity 46 formed in reset slide 24.

Once the temperature sensed by bulb 22 has exceeded the temperature set point of thermostat 20, the snap action mechanism (not shown) operates to transition the actuating mechanism 38 to the position shown in FIG. 5. As may be seen, the translation of the actuating mechanism 38 away from the reed switch 25 causes the lock rod 26 to extend outwardly of the terminal block 30. In this position, the spring force applied by spring 44 causes the reset slide 24 to position the locking sled 34 to block, via contact with shoulder 32, translation of the actuating mechanism 38 back to the position illustrated in FIG. 4. In this way, the contacts of reed switch 25 are held open to prevent re-ignition of the burner by holding the actuating mechanism 38 in this position even after the temperature of the environment being sensed has cooled below the normal reset temperature of thermostat 20. To reset this thermostat 20, service personnel are required to slide the reset slide 24 in a direction away from engagement with the lock rod 26. Once the locking sled 34 has been moved out of engagement with the locking shoulder 32, the snap action mechanism (not shown) transitions the actuating mechanism 38 back to the position illustrated in FIG. 4, thereby causing the contacts of reed switch 25 to again close to re-enable automatic control by the control thermostat 21.

Figure 6:
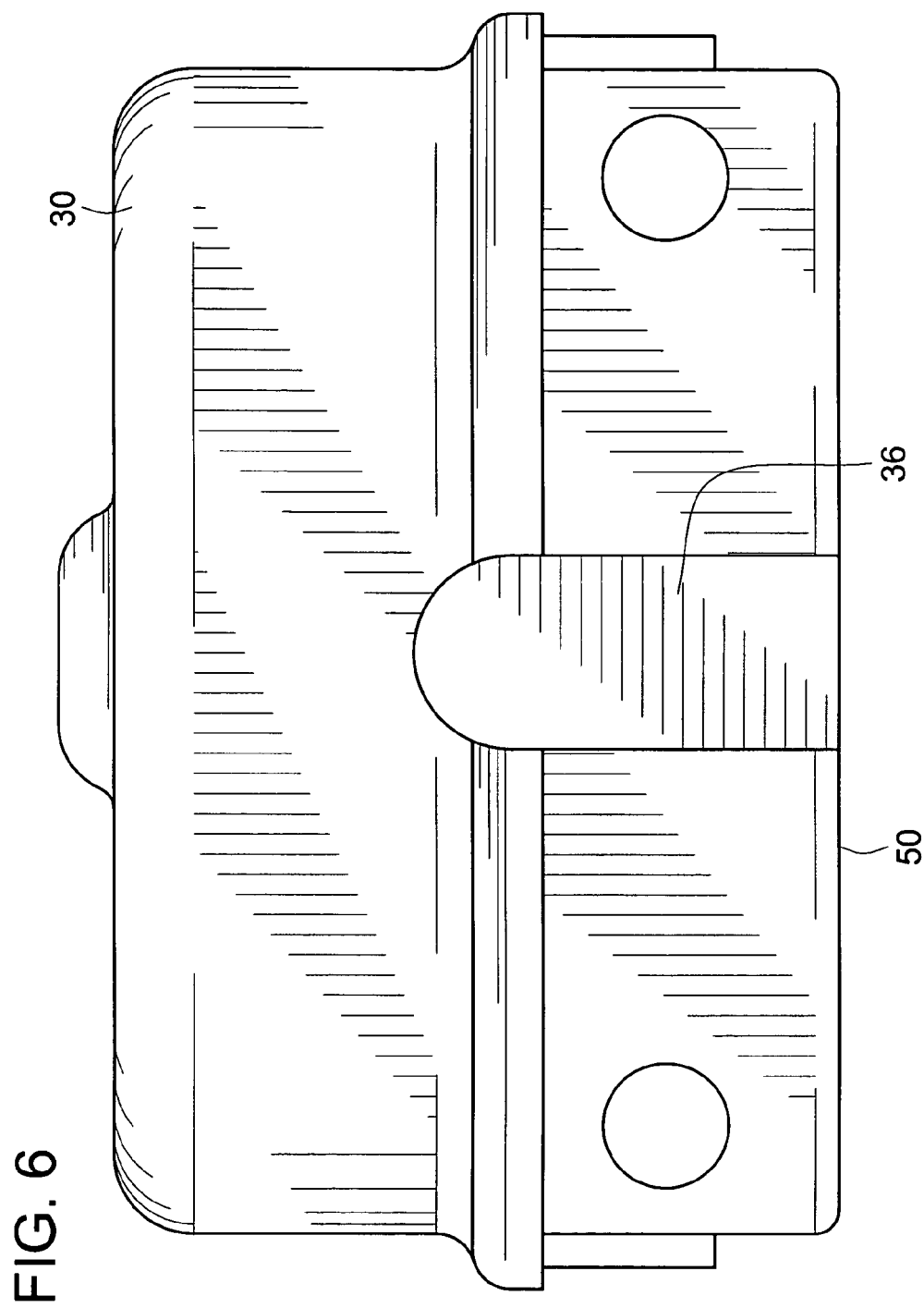
FIG. 6 is a top view illustration of a terminal block of the embodiment of the present invention illustrated in FIG. 2.

As may be seen from the top view illustration of FIG. 6, the terminal block 30 includes the elongated channel 36 that extends from a cover mating end 50 received in the cover 28 of the thermostat housing. The end diameter of channel 36 is sufficient to allow free passage of the locking shoulder 32 therethrough. The width of the channel 36 is sized to accommodate a width of the locking sled 34 of the reset slide 24. In this way, operation of the manually re-settable thermostat lockout mechanism is facilitated. That is, proper alignment of the locking sled 34 in relation to the lock rod 26 is aided by the channel 36 in the embodiment.

Figure 7:
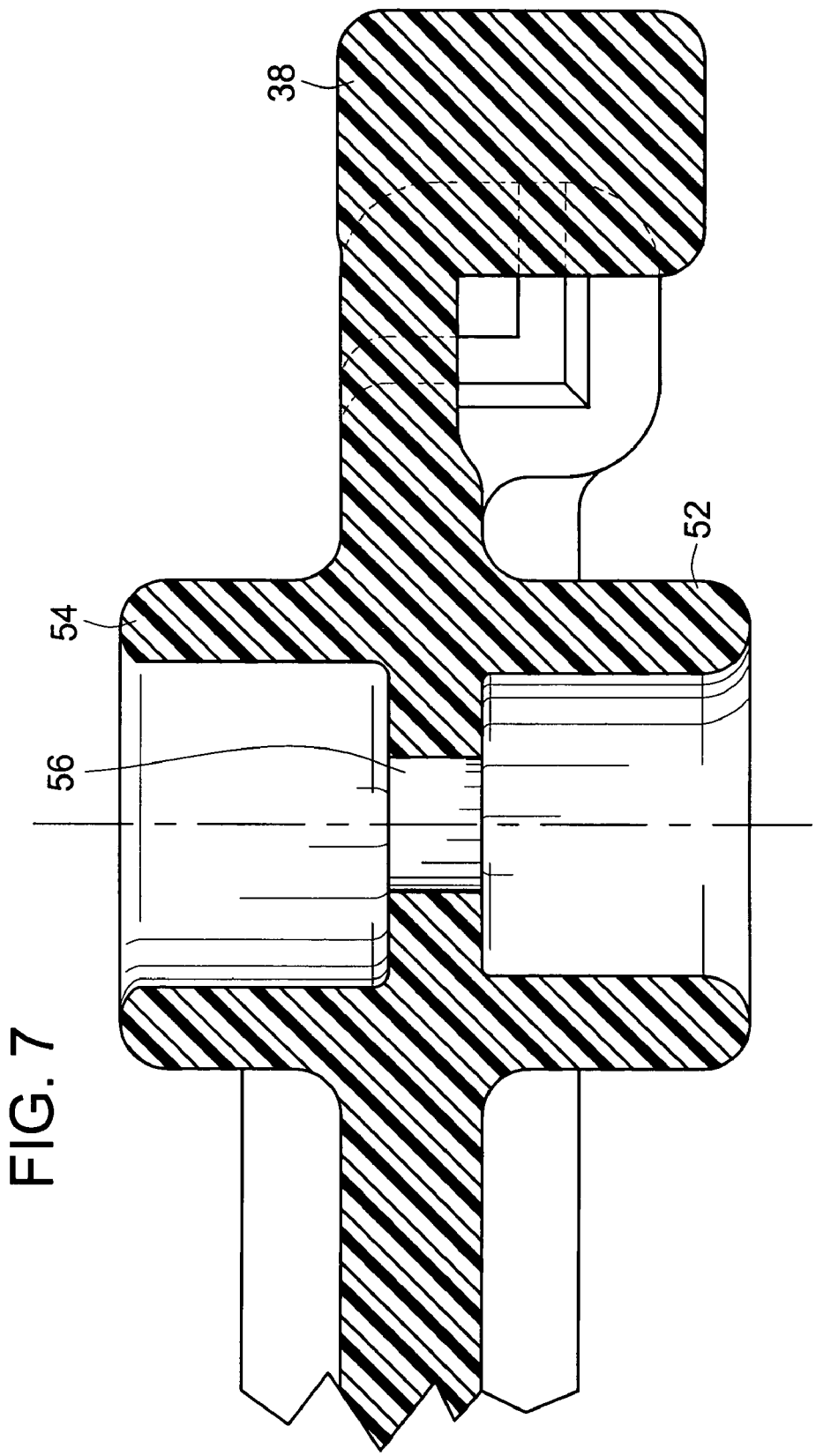
FIG. 7 is a partial cross-sectional illustration of an actuating mechanism for use in the embodiment of FIG. 2.

FIG. 7 illustrates a partial cross-sectional view of the actuating mechanism 38. As may be seen from this cross-sectional illustration, in this embodiment of the present invention the actuating mechanism 38 includes a locking rod receptacle 52 into which the locking rod is retained. Opposite the locking rod receptacle 52, the actuating mechanism 38 also defines a fastener receptacle 54. Between these two receptacles 52, 54 there is provided a bore 56 through which the fastener is able to engage the end of the locking rod 26. Preferably, the fastener is non-ferrous so as to not affect the ability of magnet 33 to effectuate a contact state change in the reed switch 25.

An embodiment of the locking rod 26 of the present invention is illustrated in FIG. 8. As may be seen from this FIG. 8, the locking rod 26 includes a mounting base 58 into which is provided a fastener receiving bore 60. A necked down portion 62 leads to a reduced diameter portion 64. The reduced diameter portion 64 terminates in a locking head 66 that defines the locking shoulder 32 that is engaged by the locking sled 34 of the reset slide 24. Preferably, the outer surface 68 of the locking head 66 provides an angled profile that forms a cam surface in relation to the locking sled 34. In this way, as the lock rod 26 transitions to its actuated position, the outer surface 68 in contact with the locking sled 34 causes a rearward movement of the reset slide 24 to further compress the spring 44. Once the lock rod 26 has translated to its actuated position, the locking sled is then able to slide, under force of spring 44 into engagement with the locking shoulder 32. By first providing a rearward movement of reset slide 24, the angled cam surface 68 of the locking rod 26 ensures that the reset slide 24 is not stuck in its quiescent state to further increase the reliability of the manual lockout mechanism. However, one skilled in the art will recognize that surface 68 may also be perpendicular to the contact point with the locking sled 34.

Figure 10:
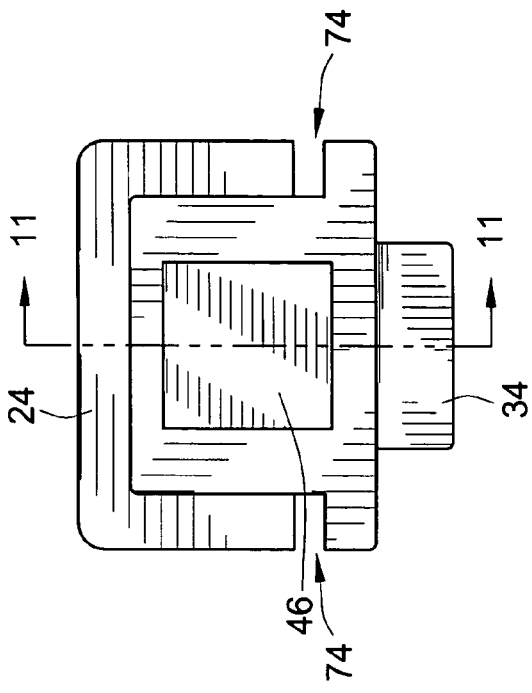
FIG. 10 is an end view of the reset slide of FIG. 9.
Figure 11:
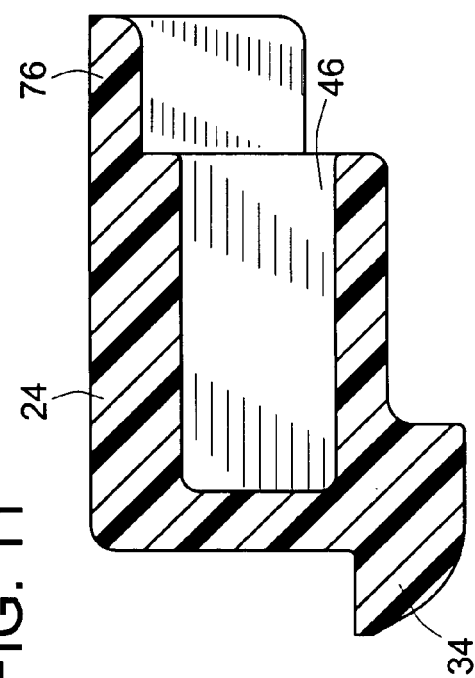
FIG. 11 is a cross-sectional illustration of the reset slide taken along line 11—11 of FIG. 10.
Figure 9:
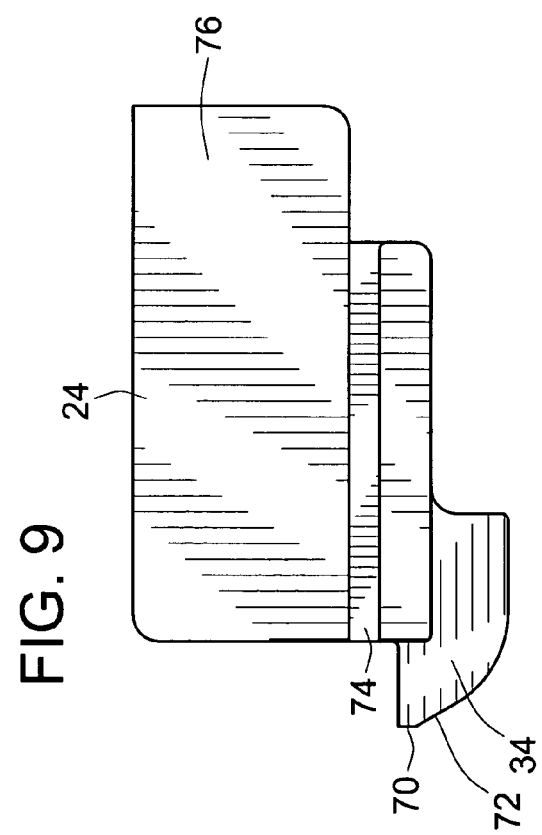
FIG. 9 is a side view illustration of a reset slide used in the embodiment of FIG. 2.
Figure 14:
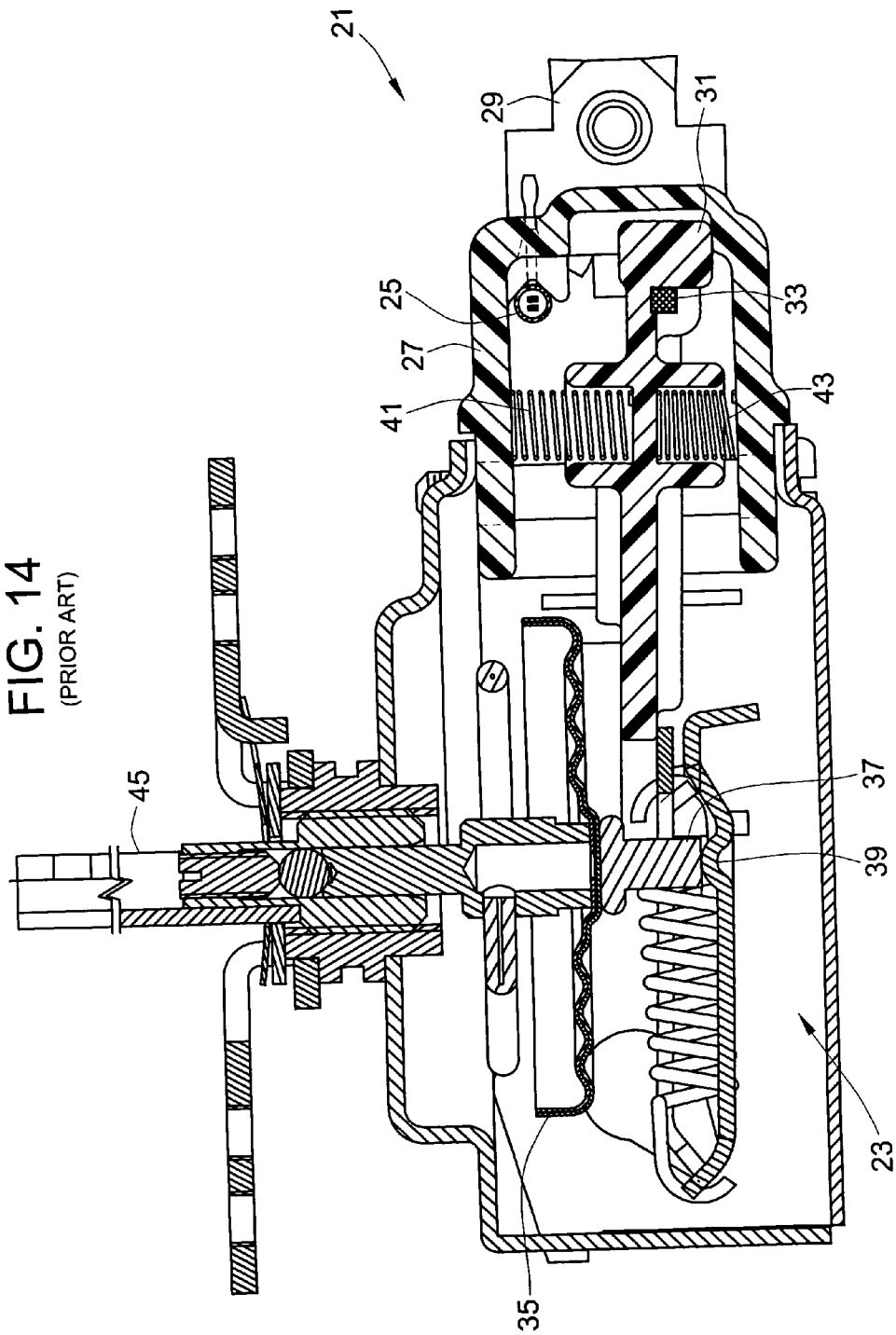
FIG. 14 is a cross-sectional illustration of a prior art model RX thermostat having contacts of a reed switch in an open position.
Figure 15:
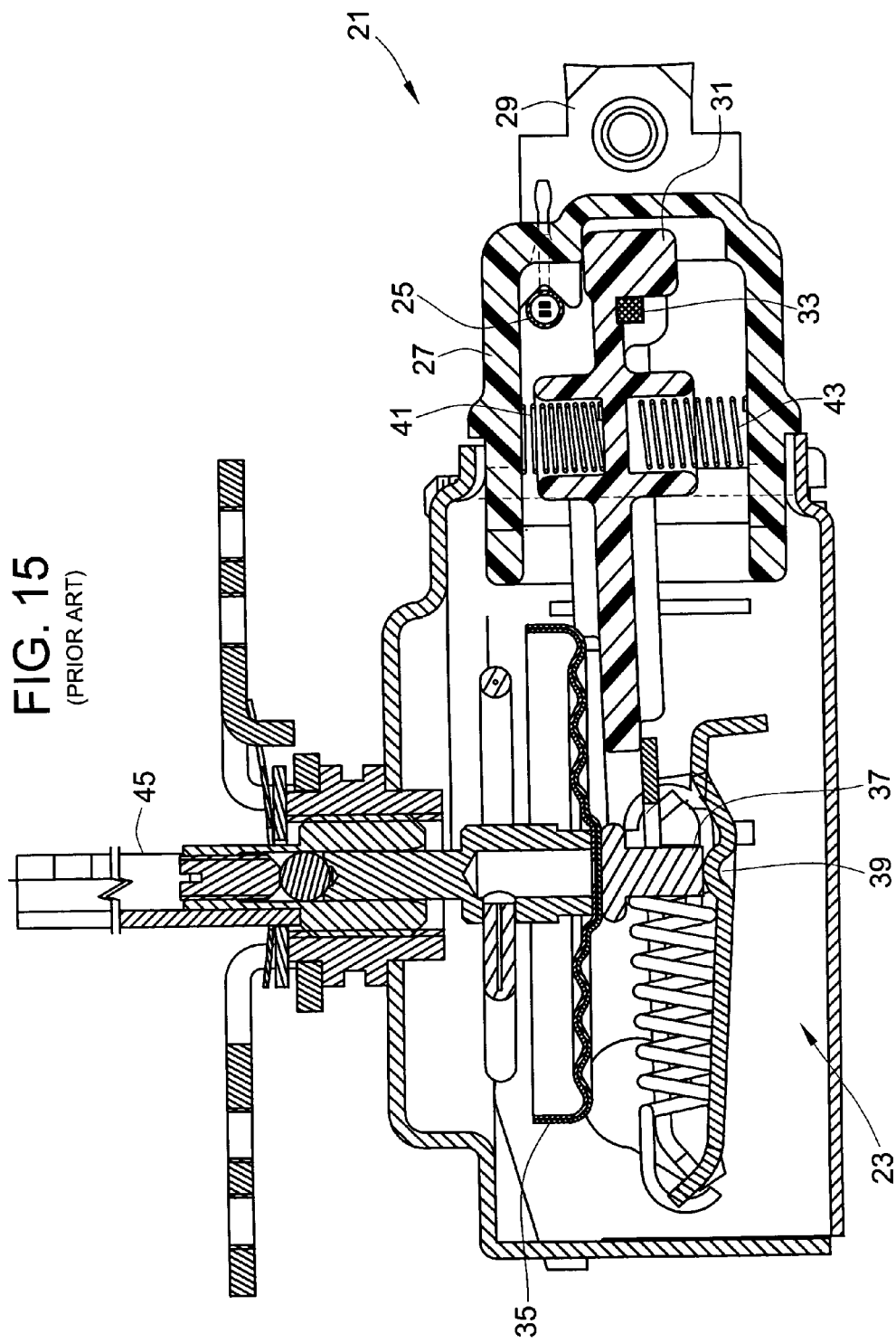
FIG. 15 is a cross-sectional illustration of a prior art model RX thermostat having contacts of a reed switch in a closed position.

FIG. 9 illustrates a side view illustration of the reset slide 24. As may be seen from this side view illustration, the forward contact surface 70 of the locking sled 34 is flat so as to provide a wider contact area with the reduced diameter portion 64 of the lock rod 26. Below this contact surface 70, the locking sled 34 includes an angled surface 72 that contacts the cam surface 68 of the locking rod 26. The reset slide 24 also includes a back cover receiving slot 74 on either side, as may be more clearly seen in the end view illustration of FIG. 10. The width of these slots 74 is sufficient to receive the thickness of the back cover of the thermostat housing to allow the sliding switch 24 to smoothly translate therealong without undue play. This reset slide 24 also includes a rearward cowl 76 as may be better seen in the cross-sectional illustration of FIG. 11. This cowl accommodates the spring tab 42 of the back cover 28 and allows lateral translation of the switch 24 thereover.

As may be seen from the top view illustration of the back cover 28 of FIG. 12, the slots 74 of the reset slide 24 are accommodated in channel 80. This channel 80 terminates in the spring tab 42, which in a preferred embodiment, is bent upward as illustrated in FIG. 13. As discussed above, this spring tab 42 provides the back end support to the spring 44 used to bias the switch 24 to contact the lock rod 26.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A high limit electric thermostat having a temperature sensing bulb coupled via a capillary tube to a diastat within the thermostat housing, the diastat deflecting in response to expansion and contraction of fluid within the temperature sensing bulb, the deflection of the diastat acting through a member activates a snap-action mechanism at a particular temperature to transition an actuating mechanism from a first position to a second position to actuate a switch therein, the thermostat comprising:
   a terminal block having a first channel defined therein;
   a lock rod affixed to the actuating mechanism and extending through the first channel in the terminal block;
   a back cover having a second channel defined therein, the second channel terminating in a spring tab;
   a reset slide slidably accommodated in the second channel, the reset slide having a locking sled extending therefrom; and
   a bias spring operably positioned between the spring tab and the reset slide to bias the reset slide toward the lock rod.

2. The thermostat of claim 1, wherein the lock rod includes a reduced diameter portion that terminates in a locking head that defines the locking shoulder therebetween.

3. The thermostat of claim 2, wherein the locking head is extended through the first channel upon transition of the actuating mechanism from the first position to the second position, and wherein the locking sled of the reset slide is biased toward the reduced diameter portion in proximity to the locking shoulder.

4. The thermostat of claim 3, wherein transition from the second position to the first position of the actuating mechanism is prohibited by the locking sled of the reset slide in contact with the locking shoulder of the lock rod.

5. The thermostat of claim 4, wherein transition from the second position to the first position of the actuating mechanism is allowed upon manual action to slide the reset slide away from the lock rod against the bias of the bias spring.

6. The thermostat of claim 2, wherein an outer surface of the locking head provides an angled profile that forms a cam surface in relation to the locking sled of the reset slide.

7. The thermostat of claim 1, wherein the locking sled of the reset slide is accommodated in the first channel.

8. The thermostat of claim 1, wherein the reset slide defines a cavity therein to accommodate the bias spring, and a cowl extending reward of the cavity to accommodate the spring tab of the back cover during movement of the reset slide, the reset slide further defining a pair of cover receiving slots on either side thereof to slidably position the reset slide within the second channel.

9. A high limit electric thermostat comprising:
   a thermostat housing;
   a diastat positioned within the thermostat housing;
   a temperature sensing bulb coupled via a capillary tube to the diastat;
   a switch mechanism operably coupled to the diastat;
   a lock rod affixed to the switch mechanism and extending through the thermostat housing;
   a reset slide operably engaging the lock rod to allow transition of the switching mechanism from a first state to a second state and to prevent transition of the switching mechanism from the second state to the first state.

10. The thermostat of claim 9, wherein the switch mechanism comprises a snap action mechanism operably coupled to the diastat, and an actuating mechanism coupled to the snap action mechanism, and wherein the lock rod is affixed to the actuating mechanism.

11. The thermostat of claim 10, wherein the diastat deflects in response to expansion and contraction of fluid within the temperature sensing bulb, the deflection of the diastat, acting through a member, activates a snap-action mechanism at a particular temperature to transition the actuating mechanism from the first position to the second position, the actuating mechanism having a magnet positioned therein, the switch mechanism further comprising a reed switch positioned in proximity to the actuating mechanism such that transition of the actuating mechanism between the first and the second positions transitions contacts of the reed switch.

12. The thermostat of claim 9, wherein the reset slide is slidably accommodated in a first channel in the thermostat housing, the first channel terminating in a spring tab, the thermostat further comprising a bias spring operably positioned between the spring tab and the reset slide to bias the reset slide toward the lock rod.

13. The thermostat of claim 12, wherein the thermostat housing includes a terminal block, and wherein the first channel is defined in the terminal block.

14. The thermostat of claim 12, wherein the thermostat housing defines a second channel through which the lock rod extends, wherein the reset slide includes a locking sled extending therefrom, and wherein the second channel further slidably accommodates the locking sled therein.

15. The thermostat of claim 14, wherein the thermostat housing includes a back cover, and wherein the second channel is defined in the back cover.

16. The thermostat of claim 9, wherein the reset slide is manually operable to allow transition of the switching mechanism from a second state to a first state.

17. The thermostat of claim 9, further comprising an adjusting screw to allow a user to vary an operating point of the switch mechanism.

18. A temperature regulation system, comprising:
- a primary temperature control thermostat having a first temperature sensing element positioned within an environment to be regulated;
- a high temperature limit thermostat having a second temperature sensing element positioned within an environment to be regulated;
- a heating control mechanism electrically coupled to the primary temperature control thermostat and to the high temperature limit thermostat such that the heating control mechanism shuts off when either of the primary temperature control thermostat and the high temperature limit thermostat commands the heating control mechanism to shut off; and
- wherein the high temperature limit thermostat includes a manual reset mechanism comprising a lock rod affixed to a switch mechanism of the high temperature limit thermostat and extending through housing thereof, and a reset slide operably engaging the lock rod to allow transition of the switching mechanism from a first state to a second state and to prevent transition of the switching mechanism from the second state to the first state.

19. The system of claim 18, wherein manual resetting via the reset slide is required once the high temperature limit thermostat commands the heating control mechanism to shut off before the high temperature limit thermostat can transition from the second state to the first state.

20. The system of claim 18, wherein the temperature at which the high temperature limit thermostat commands the heating control element to shut off is preset.

* * * * *